United States Patent
Utsubo

(10) Patent No.: US 7,426,207 B2
(45) Date of Patent: Sep. 16, 2008

(54) DATA TRANSMITTING METHOD OF NETWORK LINE

(75) Inventor: Yoshiaki Utsubo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 874 days.

(21) Appl. No.: 10/677,533

(22) Filed: Oct. 3, 2003

(65) Prior Publication Data
US 2004/0076159 A1    Apr. 22, 2004

(30) Foreign Application Priority Data
Oct. 7, 2002    (JP) ............................... 2002-293780

(51) Int. Cl.
*H04L 12/28* (2006.01)
(52) U.S. Cl. .................. 370/389; 370/392; 370/401
(58) Field of Classification Search ................ None
See application file for complete search history.

(56) References Cited

U.S. PATENT DOCUMENTS

| | | | | |
|---|---|---|---|---|
| 6,128,294 A | * | 10/2000 | Oura et al. ................. | 370/389 |
| 6,512,774 B1 | * | 1/2003 | Vepa et al. ................. | 370/401 |
| 6,925,079 B2 | * | 8/2005 | Matsukawa ................. | 370/389 |
| 7,046,666 B1 | * | 5/2006 | Bollay et al. ............... | 370/392 |
| 7,095,746 B1 | * | 8/2006 | Frei ........................... | 370/401 |

FOREIGN PATENT DOCUMENTS

JP    11-053143    2/1999

* cited by examiner

*Primary Examiner*—Chau T. Nguyen
*Assistant Examiner*—Kenneth R Hartmann, II
(74) *Attorney, Agent, or Firm*—Rabin & Berdo, P.C.

(57) ABSTRACT

When a personal computer transmits an IP address and detects a defective line connection, it issues a transmitting request of addresses to all apparatuses including printers connected to a network line. When a received MAC address coincides with its own MAC address held in the computer, print data is transmitted to the printer having the received IP address and the held own IP address of the printer is updated by the received IP address.

9 Claims, 6 Drawing Sheets

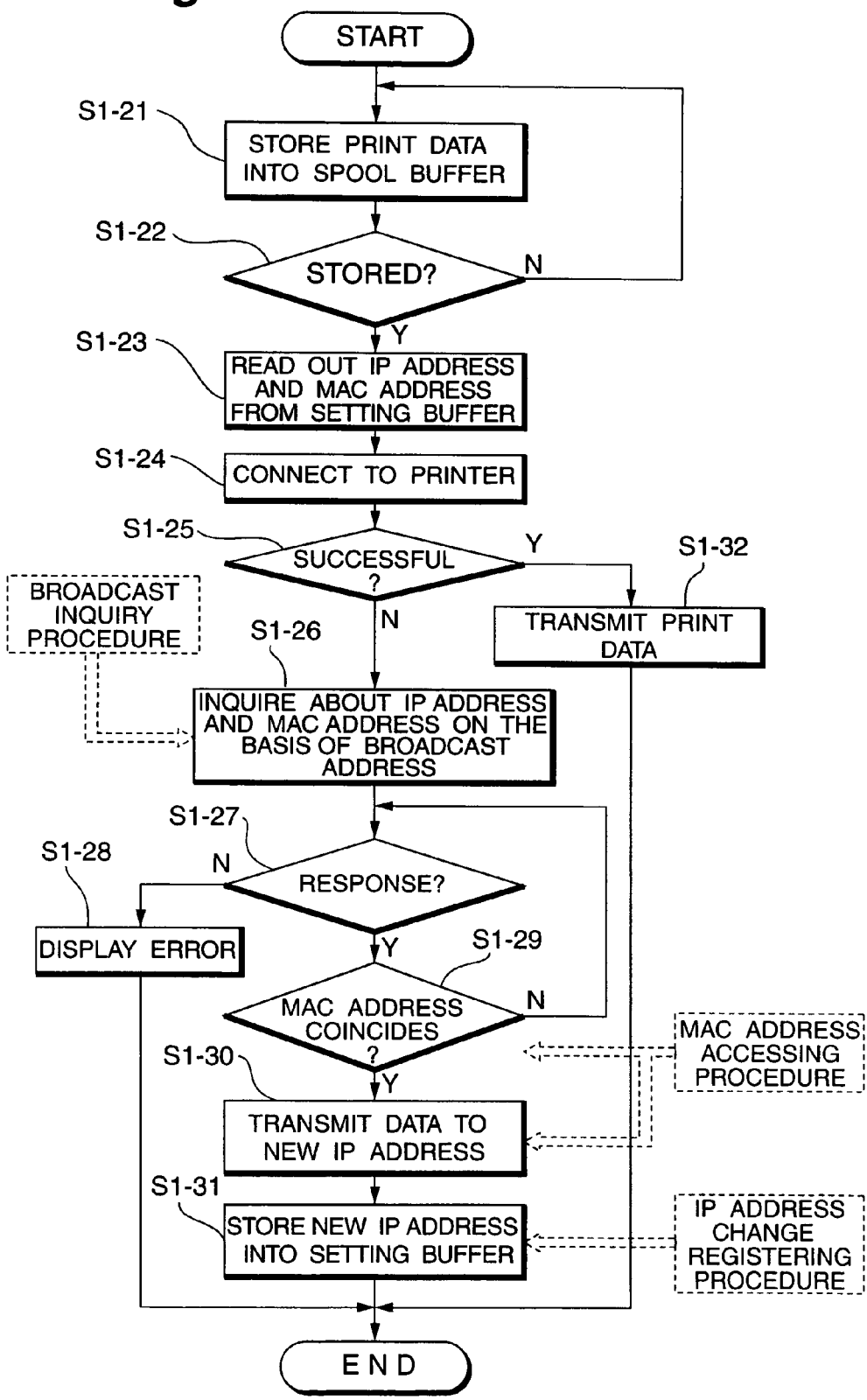

DATA TRANSMITTING METHOD OF NETWORK LINE

BACKGROUND OF THE INVENTION

1. Field of the Invention

The invention relates to a data transmitting method of a network line in a TCP/IP protocol environment.

2. Related Background Art

In recent years, networking of various apparatuses has been progressed owing to the spread of the Internet. Not only a personal computer and a printer in each home but also an electric refrigerator, an electric washing machine, and the like have begun to be connected to a network. IP (Internet Protocol) addresses are dynamically allocated to most of those apparatuses by an Internet service provider.

In this case, since the IP address changes each time it is allocated, a server to render an address solving service and a name solving service is arranged and it executes a conversion from a host name or an MAC (Media Access Control) address into an IP address.

However, it is difficult to arrange the server to a small LAN such as a home LAN (Local Area Network) or the like. Therefore, development of a network line connecting method whereby the server is not arranged has been progressed (for example, refer to a patent literature 1: JP-A-11-53143 (pages 2-3, FIG. 1).

An outline of the patent literature 1 will now be described with reference to the drawing.

FIG. 7 is a diagram showing a conventional network printer connecting construction.

When built-in utility software is activated, each of host apparatuses 101 and 102 broadcasts a packet (information of a predetermined size obtained by lumping information) for management and setting onto the LAN. Since the broadcast denotes that data is transmitted to all apparatuses connected to the network irrespective of the IP address, even if no IP address is set, if the apparatuses have physically been connected to the network, the packet is sent to all printing apparatuses (hereinafter, simply referred to as printers). Such a packet is called a response request packet.

When the packet is received, a printer 104 which supports the software returns response data to the host apparatuses on the basis of the utility software.

The utility software displays the response data from the printer 104 which made a response onto display screens of the host apparatuses, thereby allowing the operator to recognize which printer is operating at present. Since the MAC address held in each NIC (Network Interface Card) 103 is included in the response data, the MAC address of the printer 104 can be recognized.

In the case of setting an IP address or the like into the printer, a set packet including the MAC address of a partner printer into which the operator wants to set the IP address is broadcasted. Since the set packet is sent by the broadcast, it is sent to all of the printers in a manner similar to the response request packet.

The printer 104 which received the set packet compares its own MAC address with the MAC address described in the response request packet. If they coincide, the printer 104 determines that the packet has been sent to itself and sets the IP address. If they do not coincide, the printer 104 determines that the packet has been sent to another printer and abandons the data. As mentioned above, the IP address can be set also to the printer in which the IP address is not set yet.

In the prior art described above, the IP address can be set without arranging the server to the small LAN. However, according to the prior art, a problem to be solved such that irrespective of whether the IP address is newly registered or has already been registered or whether the IP address has been changed or not, in all cases, it has to be transmitted by the broadcast and reset on the printer side, and thereafter, the data has to be transmitted, so that processes become complicated, still remains.

SUMMARY OF THE INVENTION

It is an object of the invention to provide a data transmitting method of a network line, in which data transmitting processes are simplified in a method whereby a data transmitting apparatus and a plurality of data receiving apparatuses are connected via the network line and data is transmitted from the transmitting apparatus to one of the receiving apparatuses.

To accomplish the above object, the invention uses the following constructions.

Construction 1

According to the invention, there is provided a data transmitting method of a network line, which connects, via the network, a transmitting apparatus for transmitting data to a plurality of receiving apparatuses for receiving the data line and transmits the data from the transmitting apparatus to one of the receiving apparatuses, comprising the steps of:

holding an MAC (Media Access Control) address that is peculiar to each of the receiving apparatuses and a changeable IP (Internet Protocol) address into each of the receiving apparatuses;

previously holding the MAC address and the IP address into the transmitting apparatus every receiving apparatus so as to correspond to each other;

outputting a predetermined IP address from the transmitting apparatus to the network line and, when the transmitting apparatus detects completion of the line connection to the receiving apparatus which holds the predetermined IP address, transmitting the data from the transmitting apparatus to the receiving apparatus; and when the transmitting apparatus detects a defect in the line connection, outputting a transmitting request of the IP address and the MAC address from the transmitting apparatus to each of the receiving apparatuses, when the transmitting apparatus detects coincidence of its own MAC address held therein and the received MAC address, allowing the transmitting apparatus to update the IP address corresponding to its own MAC address held therein to the received IP address, and transmitting the data to the receiving apparatus which holds the received IP address.

Construction 2

In the data transmitting method of the network line according to the construction 1, when the transmitting apparatus detects the completion of the line connection, the transmitting request of the MAC address is outputted from the transmitting apparatus to the receiving apparatus which holds the predetermined IP address, and when the transmitting apparatus detects the coincidence of its own MAC address held therein and the received MAC address, the data is transmitted from the transmitting apparatus to the receiving apparatus which holds the predetermined IP address.

Construction 3

In the data transmitting method of the network line according to the construction 1, the transmitting apparatus comprises a personal computer having a printer driver for generating print data as the data and the receiving apparatus is a network printer.

Construction 4

In the data transmitting method of the network line according to the construction 1, the transmitting request of the IP address and the MAC address is outputted from the transmitting apparatus to the receiving apparatus and a table in which the received MAC address and the received IP address of each of the receiving apparatuses are made to correspond to each other is preliminarily formed in the transmitting apparatus.

The above and other objects and features of the present invention will become apparent from the following detailed description and the appended claims with reference to the accompanying drawings.

BRIEF DESCRIPTION OF THE DRAWINGS

FIG. 4 is a flowchart (part 2) of the embodiment 1;

DETAILED DESCRIPTION OF THE PREFERRED EMBODIMENTS

An embodiment of the invention will be described hereinbelow with reference to the drawings.

In the invention, when a personal computer (hereinafter, also referred to as a PC) transmits data (for example, print data) to an unregistered printer (an example), the PC directly accesses the unregistered printer, obtains a reply of an IP address and an MAC address of the printer, and registers (stores) those addresses so as to correspond to each other.

When the data is transmitted to a printer in which an IP address and an MAC address have already been registered, the PC directly accesses the printer and sends the data thereto. In this case, if the IP address has already been changed, first, IP addresses and MAC addresses of all printers physically connected to a network are collected on the basis of broadcast addresses. Subsequently, the registered MAC address of the printer on the transmission destination side is compared with the collected MAC addresses, thereby detecting the coincident MAC address. If the coincident MAC address can be detected, it is determined that the IP address of the printer on the transmission destination side has been changed. The data is sent to such a printer.

Further, in this case, the registered IP address of the printer on the transmission destination side is rewritten by the IP address collected together with the coincident MAC address. Therefore, the current IP address or the latest IP address changed at the time of the previous access has been stored (registered) in the personal computer.

A network system for executing the above processes is constructed as follows.

Construction of the Embodiment 1

Figure 1:
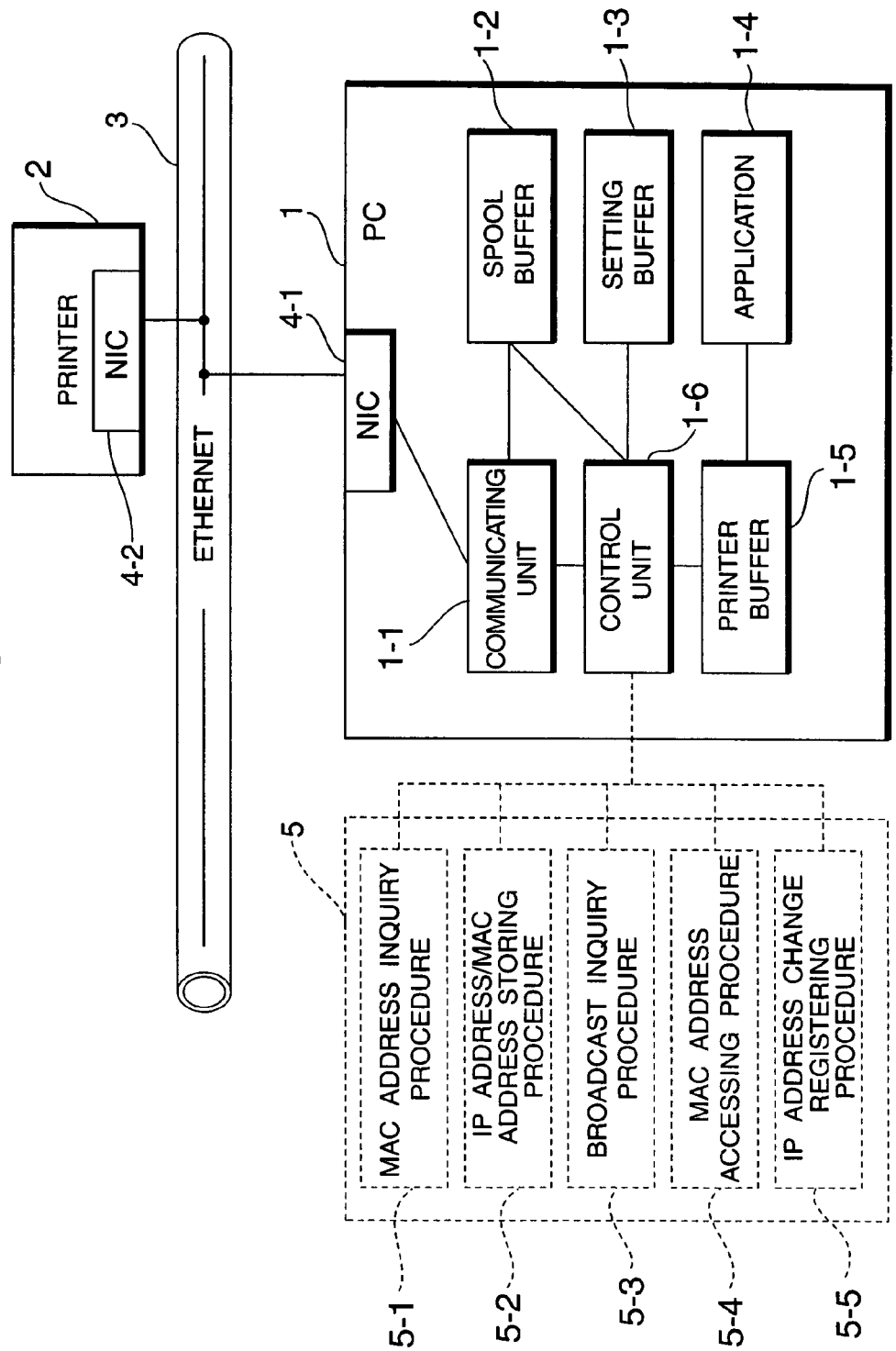
FIG. 1 is a block diagram showing a construction of an embodiment 1.

FIG. 1 is a block diagram showing a construction of an embodiment 1.

The invention will be described with respect to the case where it is applied to a network printer as an example.

Referring to FIG. 1, a personal computer (PC) 1 and a printer 2 are physically connected to a TCP/IP network of the embodiment 1 via a network cable (Ethernet) 3.

The PC 1 has: a network interface card (hereinafter, referred to as an NIC) 4-1; a communicating unit 1-1; a spool buffer 1-2; a setting buffer 1-3; an application 1-4; a printer driver 1-5; and network print software 5.

The NIC 4-1 is an expansion apparatus for connecting the PC 1 to the network and is an IC card for processing portions regarding an MAC sublayer as a lower sublayer of a data link layer of an OSI basic reference model and a physical layer. One IC card is provided for one apparatus connected to the network. A peculiar MAC address has been allocated to the NIC 4-1. The MAC address corresponds to the MAC address of the PC 1.

The communicating unit 1-1 is a portion for executing processes such as transmission of the print data to the printer, inquiry about the IP address and the MAC address, and the like. The spool buffer 1-2 is means which stores the print data and comprises, for example, a memory, a hard disk, or the like. The setting buffer 1-3 is means which stores the IP address and the MAC address of the printer to which the PC 1 sends the print data and comprises, for example, a memory, a hard disk, or the like.

The application 1-4 is software for allowing the printer to execute printing.

The printer driver 1-5 is a portion for receiving a print command from the application 1-4 and forming the peculiar print data every printer.

A control unit 1-6 controls the communicating unit 1-1, spool buffer 1-2, setting buffer 1-3, and the like in accordance with the network print software 5, which will be explained hereinlater, connects the line to the printer 2, and controls so as to transmit the print data formed by the printer driver 1-5.

The printer 2 receives the print data and executes the printing. An NIC 4-2 is also installed into the printer 2 in a manner similar to the PC 1.

The NIC 4-2 is an expansion apparatus for connecting the printer 2 to the network and is an IC card for processing portions regarding the MAC sublayer as a lower sublayer of the data link layer of the OSI basic reference model and the physical layer. One IC card is provided for one printer connected to the network. A peculiar MAC address has been also allocated to the NIC 4-2 in a manner similar to the NIC 4-1. The MAC address corresponds to the address of the printer 2.

The network cable (Ethernet) 3 is a transmitting medium which physically connects the apparatuses, thereby constructing a network. The network cable 3 is constructed by a twisted pair cable, a coaxial cable, an optical fiber cable, or the like in accordance with a type of network.

The network print software 5 is utility software which is necessary when the control unit 1-6 connects the line to the printer 2 and transmits the print data formed by the printer driver 1-5. As a part of the utility software, the network print software 5 includes a computer program for executing an MAC address inquiry procedure 5-1, an IP address/MAC address storing procedure 5-2, a broadcast inquiry procedure 5-3, an MAC address accessing procedure 5-4, an IP address change registering procedure 5-5, and the like. Only a relationship between those procedures and the hardware is shown here and a relationship with the software and its contents will be described in detail hereinlater with reference to a flowchart in the paragraphs of the operation.

Operation of the Embodiment 1

Figure 2:
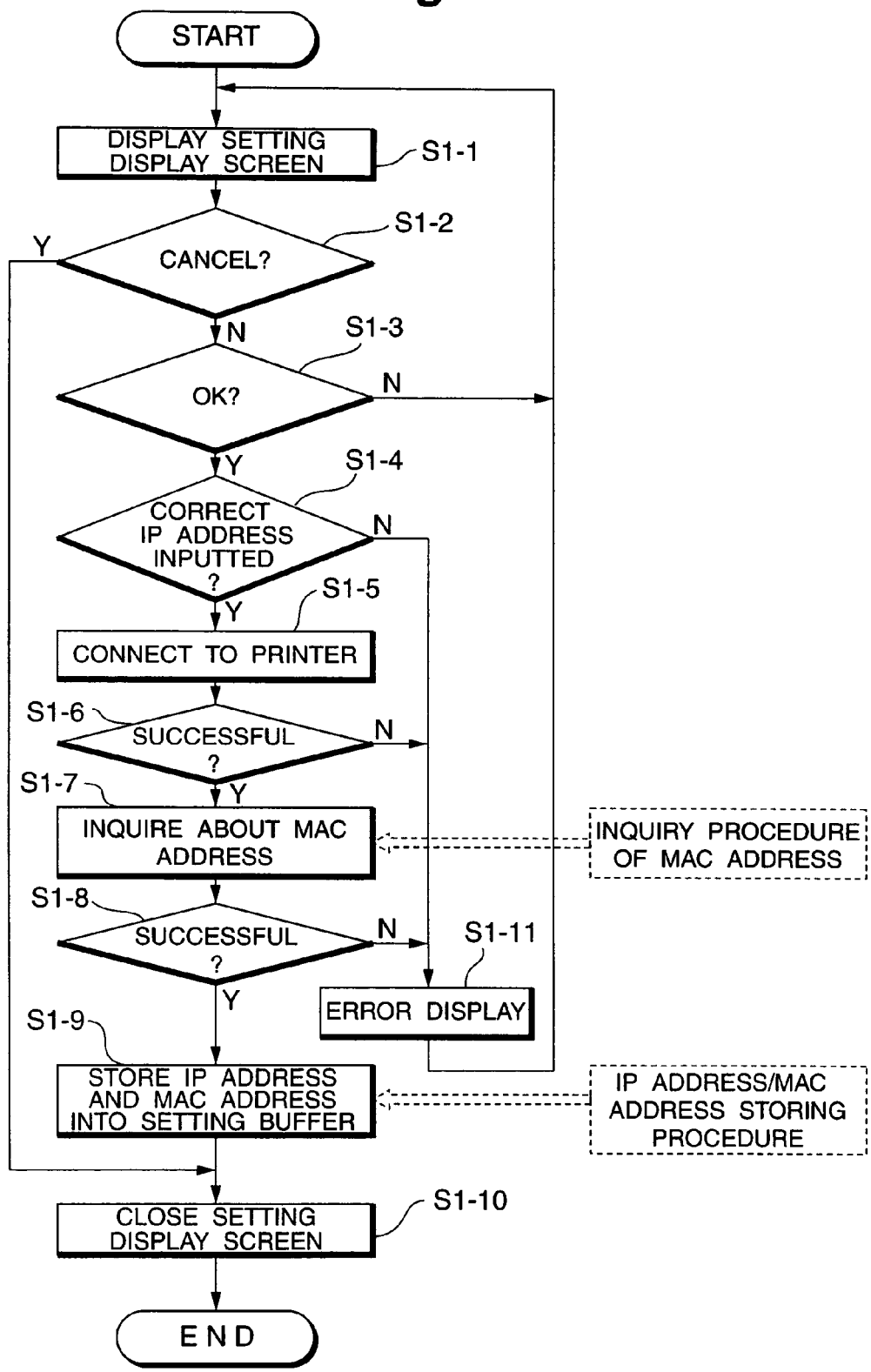
FIG. 2 is a flowchart (part 1) of the embodiment 1.

FIG. 2 is a flowchart (part 1) of the embodiment 1.

Figure 3:
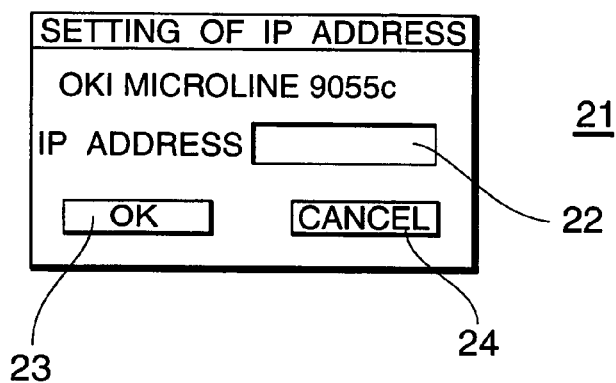
FIG. 3 is a diagram for explaining display contents on a display screen.
Figure 7:
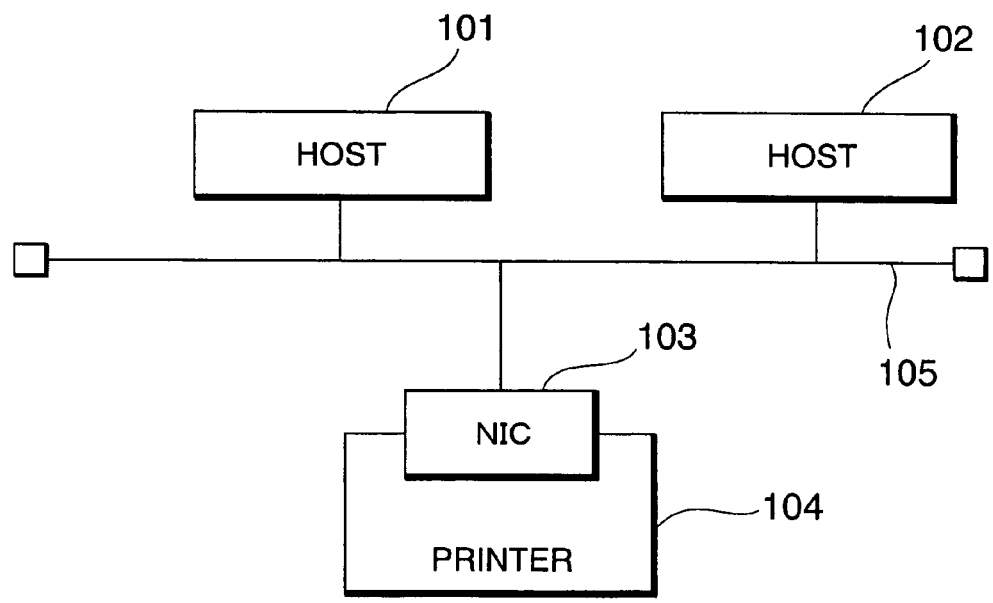
FIG. 7 is a diagram showing a connecting construction of a conventional network printer.

FIG. 3 is a diagram for explaining display contents on a display screen of the PC 1.

The operation in the case where the operator of the PC 1 registers the IP address of the printer 2 which is desired to be connected (accessed) to the line for the first time into the setting buffer 1-3 provided for the PC 1 will be described.

Step S1-1:

When a request for registering the IP address is made by the operator, the control unit 1-6 displays a setting display screen 21 shown in FIG. 3 onto a display of the PC 1. The operator inputs the IP address of the printer 2 to be registered into an IP address writing frame 22 on the display screen 21.

Step S1-2:

If the operator clicks a cancel button 24 due to an erroneous input or the like, the processing routine jumps to step S1-10 and closes the setting display screen. If the IP address is normally inputted, step S1-3 follows.

Step S1-3:

Whether an OK button 23 has been clicked or not is discriminated. If the OK button 23 is clicked, step S1-4 follows.

Step S1-4:

The control unit 1-6 discriminates whether the IP address inputted to the IP address writing frame 22 satisfies a predetermined format (for example, a notation or the like) or not. If the format is not satisfied, an error is displayed (step S1-11) and the processing routine is returned to step S1-1 of displaying the setting display screen. If the format is satisfied, the IP address is sent to the communicating unit 1-1 and the processing routine advances to the next step.

Step S1-5:

The control unit 1-6 tries to access (line connection) the printer to be registered on the basis of the IP address inputted to the IP address writing frame 22 via the communicating unit 1-1.

Step S1-6:

If the printer whose registration is requested cannot be accessed (when the line connection fails), an error is displayed (step S1-11) and the processing routine is returned to step S1-1 of displaying the setting display screen. If the printer can be accessed (when the line connection is successfully made), the processing routine advances to the next step.

Step S1-7:

The control unit 1-6 inquires of the printer 2 about the MAC address via the communicating unit 1-1. This step is the MAC address inquiry procedure 5-1. An object of this procedure is as follows.

Although the IP address is the number to specify each printer, it is an address which can be freely changed by the network administrator or the like in accordance with a state of the network. That is, the IP address upon registration is often changed after that. It is, therefore, an object to previously register the MAC addresses as addresses of the printers stored in the NIC 4-2 and specify each printer.

Step S1-8:

If the MAC address in the NIC 4-2 cannot be received from the printer via the communicating unit 11, the control unit 1-6 displays an error (step S1-11). The processing routine is returned to step S1-1 of displaying the setting display screen. If the MAC address in the NIC 4-2 is received, the processing routine advances to the next step.

Step S1-9:

The control unit 1-6 registers (stores) the IP address obtained in step S1-4 and the MAC address received from the NIC 4-2, as an address of the printer 2, into the setting buffer 1-3 so as to correspond to each other. This step is the IP address/MAC address storing procedure 52.

Therefore, even if the IP address is changed by the network administrator or the like after that, since the MAC address has been stored in correspondence to the IP address, the printer 2 can be specified.

Step S1-10:

The setting display screen is closed and the registration processing flow of the IP address is finished.

If the access is impossible in step S1-6 or the obtainment of the MAC address fails in step S1-8, this means that the printer cannot be registered into the setting buffer 1-3 by the ordinary procedure. That is, it corresponds to a case where the IP address is wrong or the like.

Subsequently, a flow in which the printing is selected by the application 1-4 and the print data formed by the printer driver 1-5 is sent to the printer 2 which has already been registered will be described. In addition, a line connecting method in the case where the IP address of the printer 2 registered in the setting buffer 1-3 has already been changed by the network administrator or the like and a change registering method of the IP address will be described.

FIG. 4 is a flowchart (part 2) of the embodiment 1.

Step S1-21:

When the printing is executed by the application 1-4, the control unit 1-6 receives the print data formed by the printer driver 1-5 and stores it into the spool buffer 1-2.

Step S1-22:

After completion of the storage of the print data in the spool buffer 1-2, the processing routine advances to the next step.

Step S1-23:

The control unit 1-6 reads out the IP address and the MAC address of the printer 2 to be transmitted from the setting buffer 1-3 and the processing routine advances to the next step.

Step S1-24:

The control unit 1-6 tries to access (line connection) the printer 2 via the communicating unit 11 on the basis of the IP address.

Step S1-25:

If the printer 2 can be accessed via the communicating unit 1-1, the control unit 1-6 sends the print data to the printer 2 (step S1-32) and the processing routine is finished. If it cannot be accessed, step S1-26 follows.

If the registered IP address of the printer 2 has been changed to an IP address of an apparatus other than the printer, the other apparatus refuses the reception of the print data in a transmission control procedure between the other apparatus and the PC 1, so that the access is unsuccessful.

Step S1-26:

If the access based on the IP address is impossible, the control unit 1-6 accesses all apparatuses connected to the network on the basis of the broadcast address via the communicating unit 1-1 and obtains a reply of the IP address and the MAC address. This process is the broadcast inquiry procedure 5-3.

An object of this procedure is as follows.

Since the printer cannot be accessed on the basis of the IP address, there is a possibility that the IP address of the printer 2 has already been changed. It is, therefore, an object to try to access the NIC 4-2 installed in the printer 2 on the basis of the peculiar MAC address.

Step S1-27:

If the response is obtained via the communicating unit 1-1, the control unit 1-6 advances to step S1-29. If there is no response, since the printer 2 is not physically connected to the network, the control unit 1-6 displays an error (step S1-28) and finishes the processing routine.

Step S1-29:

The control unit 1-6 compares the received MAC address with the MAC address which has already been registered in the NIC 4-2 (of the printer 2). If they coincide, the print data is sent to the IP address (the address of the printer 2 obtained after the change) returned together with the coincident MAC address (step S1-30). Steps S1-29 and S1-30 correspond to the MAC address accessing procedure 5-4.

If both of the MAC addresses do not coincide, the same process is executed in step S1-27 with respect to other apparatuses (it is presumed that a plurality of apparatuses are connected to the network). The processes in steps S1-27 and S1-29 are repeated until both of the MAC addresses coincide. If the coincident between both of the MAC addresses cannot be obtained with respect to all of the apparatuses, since it means that the desired printer 2 is not physically connected to the network, an error is displayed (step S1-28). The processing routine is finished. Step S1-31:

After the print data is sent to the printer 2 via the communicating unit 1-1, the control unit 1-6 registers (stores) the changed IP address of the printer 2 into the setting buffer 1-3 in correspondence to the MAC address in the NIC 4-2 (of the printer) and finishes the processing routine.

Step S1-31 is the IP address change registering procedure 5-5.

By providing this procedure, the latest IP address is certainly stored in the setting buffer 1-3.

Although the explanation has been made above on the assumption that the apparatus to be connected to the line is limited to the printer, the invention is not limited to such an example. That is, the invention is not limited to the printer but can be also applied to other kinds of apparatuses.

Although the explanation has been made above on the assumption that the network print software 5 has been built in the specific PC, the invention is not limited to such an example. That is, the network print software can be a program recorded in a recording medium such as a floppy disk or the like which can be read out by a computer.

Further, although the explanation has been made above on the assumption that each procedure is the computer program, the invention is not limited to such an example. That is, a part or all of the foregoing procedures can be constructed by hardware such as an electronic circuit and the like.

Effects of the Embodiment 1

As described above, upon registration of the IP address of the printer, the printer is directly accessed, the IP address and the MAC address of the printer are registered (stored) so as to correspond to each other, and if the IP address is changed after that, the registered IP address before the change is rewritten by the IP address obtained after the change, so that the following effects are obtained.

1. The processes which are executed in the case of newly registering the IP address are simplified.

2. Even if the IP address has already been changed, the print data can be sent to the desired printer by using the IP address before the change.

3. Further, if the printer whose IP address has been changed is accessed, since the registered IP address before the change is rewritten by the IP address obtained after the change, a probability that the subsequent access is unsuccessful decreases.

Construction of Embodiment 2

Figure 5:
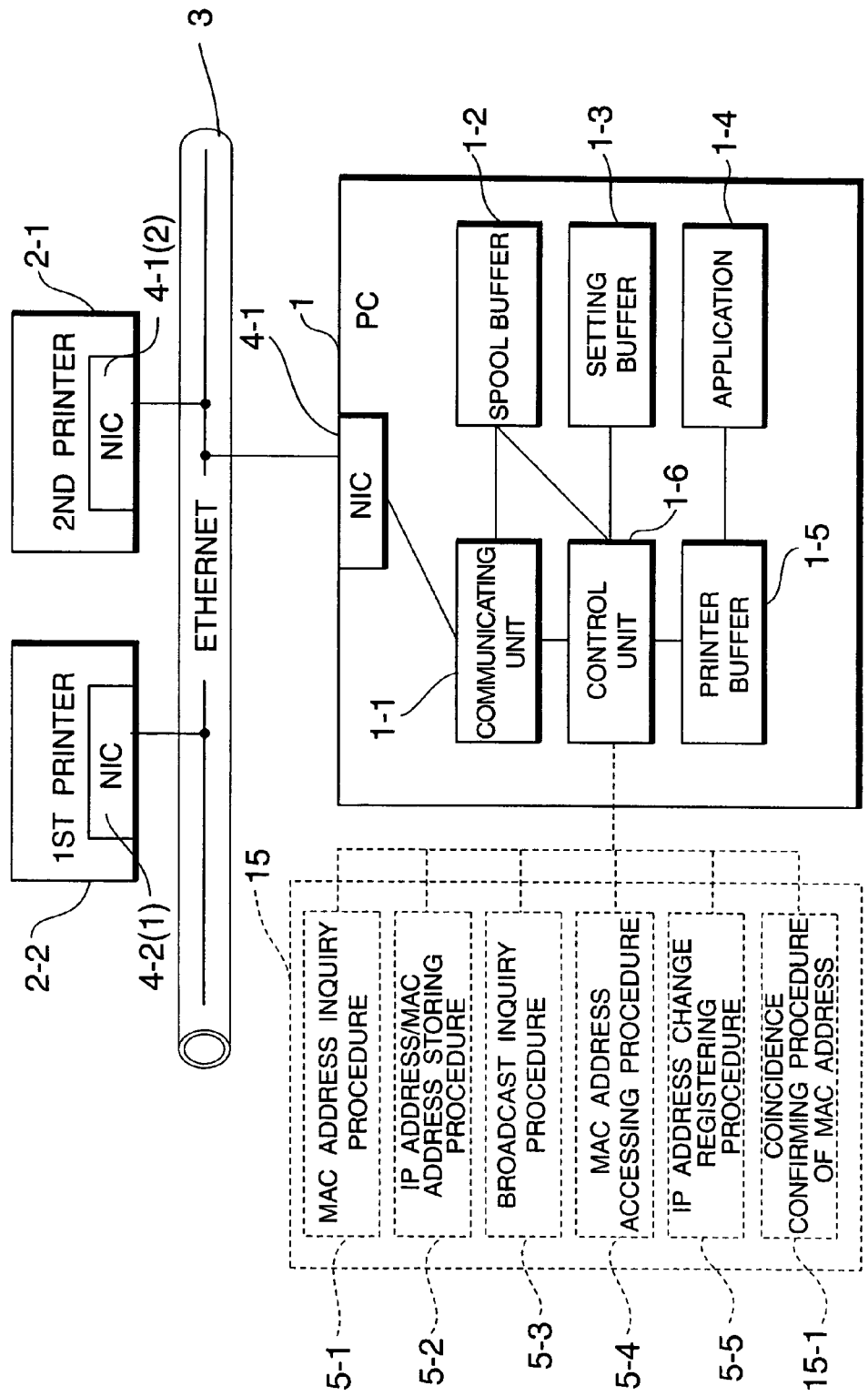
FIG. 5 is a block diagram showing a construction of an embodiment 2.

FIG. 5 is a block diagram showing a construction of the embodiment 2

A case where the invention is applied as an example to a plurality of network printers will be described.

From the diagram, the personal computer (PC) 1 and the printers 2-1 and 2-2 are physically connected to the TCP/IP network in the embodiment 2 via the network cable (Ethernet.) 3.

Only different points from the embodiment 1 will be described.

Network print software 15 is utility software which is necessary when the control unit 1-6 connects the line to the printer 2 and transmits the print data received from the printer driver 1-5. As a part of the utility software, the network print software 15 includes a computer program for executing the MAC address inquiry procedure 5-1, the IP address/MAC address storing procedure 5-2, the broadcast inquiry procedure 5-3, the MAC address accessing procedure 5-4, the IP address change registering procedure 5-5, a coincidence confirming procedure 15-1 of the MAC address, and the like. The coincidence confirming procedure 15-1 of the MAC address newly added in the embodiment 2 will be described in detail hereinlater with reference to a flowchart in the paragraphs of the operation.

The printers 2-1 and 2-2 are similar to those in the embodiment 1 physically connected to the network. Explanation will be made as an example on the assumption that the number of printers is limited to 2.

Since other component portions are similar to those in the embodiment 1, their explanation is omitted here.

Operation of the Embodiment 2

Since the operation to register IP addresses and MAC addresses of apparatuses (for example, the printers 2-1 and 2-2 (FIG. 5) here) to be newly accessed into the setting buffer 1-3 (FIG. 5) in the embodiment 2 is substantially the same as that in the embodiment 1, its explanation is omitted here.

Explanation will be made here on the assumption that the application 1-4 selects the printing, the print data formed by the printer driver 1-5 is sent to the printer 2-1, and the IP address of the printer 2-1 and that of the printer 2-2 have been exchanged.

Figure 6:
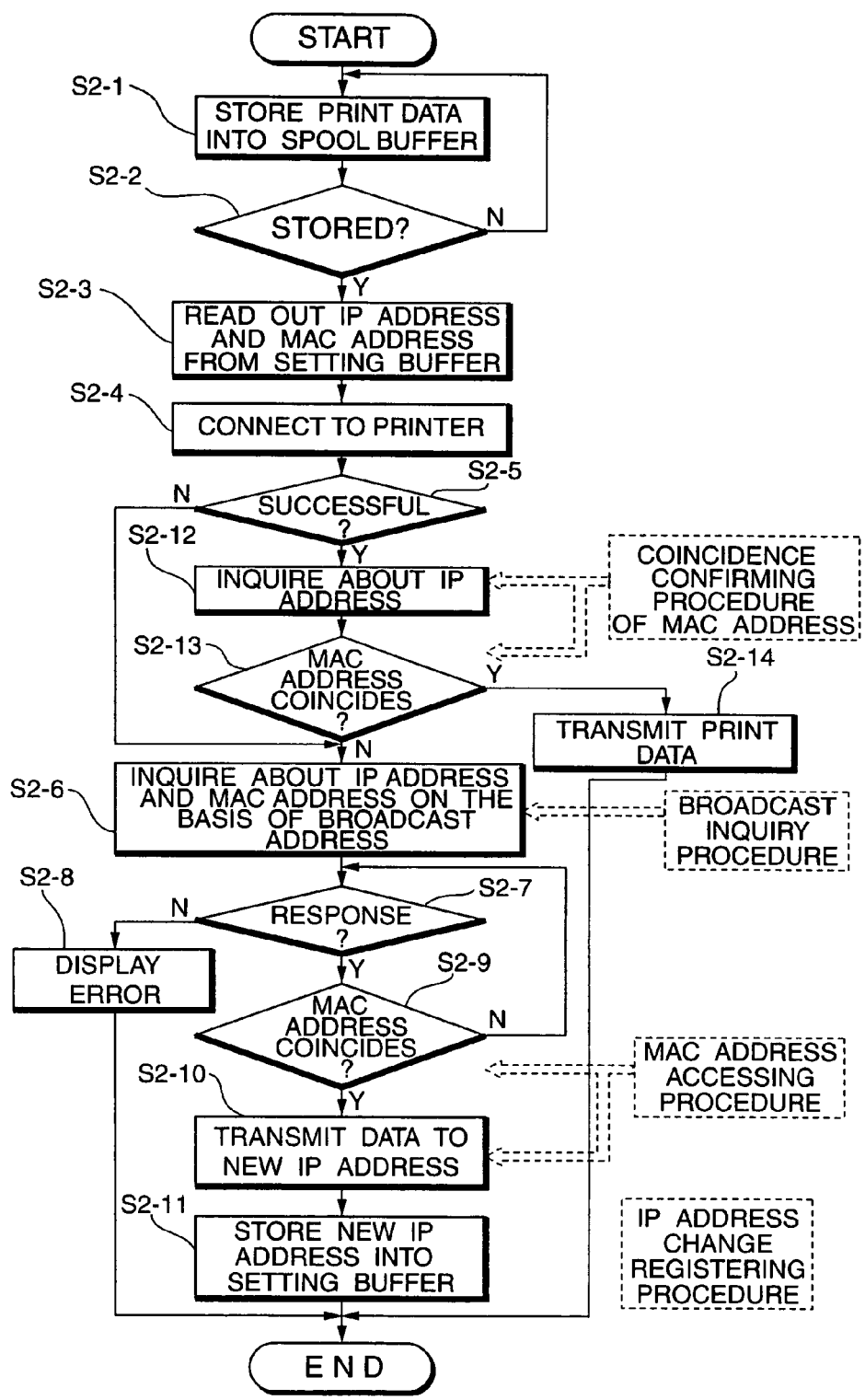
FIG. 6 is a flowchart of the embodiment 2.

FIG. 6 is a flowchart of the embodiment 2.

Only different points from the embodiment 1 will be described.

Processes in steps S2-1 to S2-4 are similar to those in steps S1-21 to S1-24 in the embodiment 1.

That is, the control unit 1-6 receives the print data formed by the printer driver 1-5 and stores it into the spool buffer 1-2. After the whole print data is stored into the spool buffer 1-2, the control unit 1-6 reads out the IP address and the MAC address of the printer 2-1 on the transmission destination side from the setting buffer 1-3. The control unit 1-6 tries to access (line connection) the printer 2-1 to be connected to the line on the basis of the IP address via the communicating unit 1-1.

Step S2-5:

If the access is successful, step S2-12 follows. If the access fails, step S2-6 follows.

Step S2-12:

The control unit 1-6 inquires of the accessed printer about the MAC address via the communicating unit 1-1.

Step S2-13:

If the received MAC address coincides with the MAC address of the printer 2-1 to be connected to the line, the print data is sent to this printer (step S2-14). The processing routine is finished. If it does not coincide, step S2-6 follows. Steps S2-12 and S2-13 correspond to the coincidence confirming procedure 15-1 of the MAC address.

It is an object of this procedure to detect a case where a plurality of printers are physically connected to the network and a case where the IP addresses of the printers among those printers have been exchanged.

That is, if the access is successful in step S2-5 and if the MAC addresses coincide in step S2-13, the line connection to the printer 2-1 to be accessed is guaranteed.

If the access is impossible in step S2-5 or if the MAC addresses do not coincide in step S2-13, step S2-6 follows.

Processes in steps S2-6 to S2-11 are similar to those in steps S1-26 to S1-31 in the embodiment 1.

Step S2-6:

The control unit 1-6 accesses all of the apparatuses connected to the network on the basis of the broadcast address via the communicating unit 1-1 and obtains a response of the IP address and the MAC address. The processing routine advances to the next step. This process is the broadcast inquiry procedure 5-3.

Step S2-7:

If the response is made via the communicating unit 1-1, the control unit 1-6 advances to step S2-9. If there is no response, since the printer 2-1 is not physically connected to the network, the control unit 1-6 displays an error (step S2-8) and finishes the processing routine.

Step S2-9:

The control unit 1-6 compares the received MAC address with the registered MAC address in the NIC 4-1 (4-2). If they coincide, the control unit 1-6 sends the print data to the IP address (the address of the printer 2-1 obtained after the change) returned together with the MAC address (step S2-10). Steps S2-9 and S2-10 correspond to the MAC address accessing procedure 5-4.

If the MAC addresses do not coincide, processes are executed with respect to other apparatuses received in step S2-7 in a manner similar to those mentioned above. The processes in steps S2-7 and S2-9 are repeated until the MAC addresses coincide. If the MAC addresses do not coincide with respect to all of the received apparatuses, since the printer 2-1 is not physically connected to the network, the control unit 1-6 displays an error (step S2-8) and finishes the processing routine.

Step S2-11:

The control unit 1-6 sends the print data to the printer 2-1 via the communicating unit 1-1, thereafter, registers (stores) the IP address of the printer 2-1 obtained after the change and the MAC address of the NIC 4-1 (4-2) into the setting buffer 1-3 so as to correspond to each other, and finishes the processing routine.

Step S2-11 corresponds to the IP address change registering procedure 5-5.

By providing such a procedure, the latest IP address is certainly stored in the setting buffer 1-3.

Although the explanation has been made above on the assumption that the apparatuses to be connected to the line are limited to the printers, the invention is not limited to such an example. That is, the invention is not limited to the printers but can be also applied to other kinds of apparatuses.

Although the explanation has been made above on the assumption that the network print software 15 has been built in the PC, the invention is not limited to such an example. That is, the network print software can be a program recorded in a recording medium such as a floppy disk or the like which can be read out by a computer.

Further, although the explanation has been made above on the assumption that each procedure is the computer program, the invention is not limited to such an example. That is, a part or all of the foregoing procedures can be constructed by hardware such as an electronic circuit or the like.

Effects of the Embodiment 2

As described above, an effect such that even when the line can be connected to the printers, by confirming the coincidence of the MAC address of the printer to be connected to the line and the MAC address of the printer which could actually been connected to the line by the coincidence confirming procedure of the MAC address, a situation such that the print data is sent to the other printer whose IP address has been changed is eliminated can be obtained.

The present invention is not limited to the foregoing embodiments but many modifications and variations are possible within the spirit and scope of the appended claims of the invention.

What is claimed is:

1. A data transmitting method for use with a network line which connects a transmitting apparatus in a network segment and a plurality of receiving apparatuses in the same network segment as the transmitting apparatus and which permits said transmitting apparatus to transmit data to a desired one of said receiving apparatuses, comprising the steps of:

in each of said receiving apparatuses, holding a MAC (Media Access Control) address that is peculiar to that receiving apparatuses and a changeable IP (Internet Protocol) address;

in said transmitting apparatus, holding the MAC address and IP address of said desired one of said receiving apparatuses so as to correspond to each other;

outputting the IP address of said desired one of said receiving apparatuses from said transmitting apparatus to said network line and, if said transmitting apparatus detects completion of a line connection to said desired one of said receiving apparatuses, transmitting said data from said transmitting apparatus to said desired one of said receiving apparatuses; and if said transmitting apparatus detects a defect of said line connection, outputting a transmitting request for the IP address and the MAC address from said transmitting apparatus to each of said receiving apparatuses, and if said transmitting apparatus detects a coincidence between the MAC address of said desired one of said receiving apparatuses held therein and a received MAC address, allowing said transmitting apparatus to update the IP address corresponding to the MAC address of the desired one of said receiving apparatuses held therein to the received IP address, and transmitting said data to the desired one of said receiving apparatuses.

2. The method according to claim 1, wherein if said transmitting apparatus detects the completion of said line connection, said transmitting apparatus outputs a request for the MAC address of the connected receiving apparatus, and if said transmitting apparatus detects a coincidence between the MAC address of the desired one of said receiving apparatuses held therein and the received MAC address, said data is transmitted from said transmitting apparatus to the IP address held in said transmitting apparatus.

3. The method according to claim 1, wherein said transmitting apparatus comprises a personal computer having a printer driver for generating print data as said data and the desired one of said receiving apparatuses is a network printer.

4. The method according to claim 1, wherein the MAC address and IP address received from each receiving apparatus in response to said transmitting request from said transmitting apparatus are stored in a table, in which the received MAC address and the received IP address of each of said receiving apparatuses are made to correspond to each other, in said transmitting apparatus.

5. A method for transmitting data over a network having a physical layer, comprising the steps of:
in each of a plurality of receiving apparatuses that are connected to the physical layer, holding a MAC (Media Access Control) address that is peculiar to that receiving apparatus and an IP (Internet Protocol) address that has been changeably assigned to that receiving apparatus;
in a transmitting apparatus that holds the data and that is connected to the same physical layer as the receiving apparatuses, holding the MAC address and the IP address of a desired one of the receiving apparatuses in correspondence to each other;
outputting the IP address of the desired one of the receiving apparatuses from the transmitting apparatus to the network;
detecting whether or not the transmitting apparatus is connected over the network to the desired one of the receiving apparatuses; and
deciding whether to follow a first procedure or a second procedure depending on the results of the detecting step, the first procedure being followed if the desired one of the receiving apparatuses is detected as being connected and the second procedure being followed if the desired one of the receiving apparatuses is not detected as being connected,
wherein the first procedure comprises sending the data from the transmitting terminal to the desired one of the receiving terminals over the network, and
wherein the second procedure comprises seeking a new IP address that has been assigned to the desired one of the receiving apparatuses, including transmitting a request from the transmitting apparatus to all of the receiving apparatuses to report their MAC address and their current IP address so that the transmitting apparatus can associate the MAC address of the desired one of the receiving apparatuses that is held in the transmitting apparatus with the new IP address of the desired one of the receiving apparatuses.

6. The method of claim 5, wherein the physical layer comprises a network cable to which the transmitting apparatus and the receiving apparatuses are electrically connected.

7. The method of claim 5, wherein the detecting step comprises determining whether the transmitting apparatus is connected with a receiving apparatus having the IP address that is held in the transmitting apparatus.

8. The method of claim 7, wherein, if the transmitting apparatus is determined to be connected with a receiving apparatus having the IP address that is held in the transmitting apparatus, the detecting step further comprises transmitting a request from the transmitting apparatus to the connected receiving apparatus for the connected receiving apparatus to report its MAC address so that the transmitting apparatus can check whether the reported MAC address matches the MAC address of the desired one of the receiving apparatuses that is held by the transmitting apparatus.

9. The method of claim 7, wherein the transmitting apparatus comprises a personal computer having a printer driver for generating the data and the desired one of the receiving apparatuses is a network printer.

* * * * *